United States Patent
Ballew et al.

(10) Patent No.: US 12,519,686 B2
(45) Date of Patent: Jan. 6, 2026

(54) SYSTEMS AND METHODS FOR PROVIDING NETWORK RESILIENCE USING INTERIM NODES

(71) Applicant: CenturyLink Intellectual Property LLC, Denver, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

(*) Notice: Subject to any disclaimer, the term of this patent is extended or adjusted under 35 U.S.C. 154(b) by 20 days.

(21) Appl. No.: 18/647,128

(22) Filed: Apr. 26, 2024

(65) Prior Publication Data

US 2024/0372774 A1    Nov. 7, 2024

Related U.S. Application Data (60) Provisional application No. 63/499,391, filed on May 1, 2023.

(51) Int. Cl.
| | | |
|---|---|---|
| G06F 15/173 | (2006.01) |
| H04L 41/0604 | (2022.01) |
| H04L 41/0663 | (2022.01) |
| H04L 67/1008 | (2022.01) |

(52) U.S. Cl.
CPC ...... *H04L 41/0663* (2013.01); *H04L 41/0627* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 6,327,242 B1 | 12/2001 | Amicangioli | |
| 2015/0341205 A1* | 11/2015 | Invernizzi | H04L 67/563 370/219 |
| 2017/0220435 A1* | 8/2017 | Misra | G06F 16/2365 |
| 2019/0340265 A1* | 11/2019 | Raman | G06F 16/258 |
| 2022/0335034 A1* | 10/2022 | Raman | G06F 16/2315 |

OTHER PUBLICATIONS

International Search Report and Written Opinion of the International Searching Authority, dated Jul. 16, 2024, Int'l Appl. No. PCT/US2024/026433, Int'l Filing Date Apr. 26, 2024, 14 pgs.

* cited by examiner

*Primary Examiner* — Wing F Chan
*Assistant Examiner* — Andrew Woo (57) ABSTRACT

In a system including a network, a client device connected to the network may employ services (e.g., data storage or analysis) provided by resources (e.g., computing and storage resources) of servers that are in the network and connected to the network. Under various circumstances, the ability of such a server to provide a service may degrade, or, e.g., if the server fails, cease entirely. As such, systems and methods for providing network resilience using interim nodes are provided.

18 Claims, 4 Drawing Sheets

SYSTEMS AND METHODS FOR PROVIDING NETWORK RESILIENCE USING INTERIM NODES

CROSS-REFERENCE TO RELATED APPLICATIONS

This application claims the benefit of U.S. Provisional Application No. 63/499,391 filed May 1, 2023, entitled "Systems and Methods for Providing Network Resilience Using Interim Nodes," which is incorporated herein by reference in its entirety.

FIELD

One or more aspects of embodiments according to the present disclosure relate to network services, and more particularly to systems and methods for providing network resilience using interim nodes.

BACKGROUND

In a system including a network, a client device connected to the network may employ services (e.g., data storage or processing) provided by resources (e.g., computing and storage resources) of servers that are in the network and connected to the network. Under various circumstances, the ability of such a server to provide a service may degrade, or, e.g., if the server fails, cease entirely.

It is with respect to this general technical environment that aspects of the present disclosure are related.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In examples, systems and methods for providing network resilience using interim nodes are provided. In an aspect, a system includes a first network switching device; a first server, connected to the first network switching device; and a second network switching device. The first server may be configured to provide a first service. The first network switching device may be configured: to receive a first service request, for the first service, from a client device; to forward the first service request to the first server; to detect a first trigger condition; in response to detecting the first trigger condition, to transition to an offloading state; to receive, in the offloading state, a second service request, for the first service; and to forward the second service request to the second network switching device. The second network switching device may be configured to handle the second service request.

In examples, the first server has a first set of capabilities for providing the first service; and the second network switching device has a second set of capabilities for providing the first service, the second set of capabilities being less than the first set of capabilities.

In examples, the first network switching device is further configured to determine that the second service request is a request for the first service.

In examples, the second network switching device is further configured to determine that the second service request is a request for the first service.

In examples, the second network switching device is configured to load a module, the module containing instructions that, when executed by the second network switching device, cause the second network switching device to provide the first service.

In examples, the detecting of the first trigger condition comprises determining that the first server has failed.

In examples, the first network switching device is further configured: to receive, in the offloading state, a third service request; to forward the third service request to the second network switching device; to receive, in the offloading state, a fourth service request from a client; and to forward the fourth service request to a third network switching device.

In examples, the third service request is a request for the first service, and the fourth service request is a request for the first service.

In examples, the third service request is a request for the first service, and the fourth service request is a request for a second service, different from the first service.

In examples, the detecting of the first trigger condition comprises determining that a measure of load, on the first server, has exceeded a threshold.

In examples, the first network switching device is further configured to notify the first server that it has transitioned to the offloading state.

In examples, the first network switching device is further configured to send a query to the second network switching device to determine whether the second network switching device is configured to provide the first service.

In examples, the handling of the second service request comprises: receiving data from the client device; and storing data from the client device.

In examples, the storing of data from the client device comprises storing less than all of the data from the client device.

In examples, the second network switching device is further configured to send the data to the first server.

In examples, the detecting of the first trigger condition comprises determining that an internal latency of the first server exceeds a round trip network latency between the first network switching device and the second network switching device by more than a threshold amount.

In another aspect, a method is provided, comprising: receiving, by a first network switching device, a first service request, for a first service, from a client device; forwarding the first service request to a first server; detecting, by the first network switching device, a first trigger condition; in response to detecting the first trigger condition, transitioning to an offloading state; receiving, in the offloading state, a second service request, for the first service; sending a query to a second network switching device to determine whether the second network switching device is configured to provide the first service; receiving an affirmative response, to the query, from the second network switching device; and forwarding the second service request to a second network switching device.

In examples, the first server has a first set of capabilities for providing the first service; and the second network switching device has a second set of capabilities for providing the first service, the second set of capabilities being less than the first set of capabilities.

In examples, the method further comprises: detecting that the first trigger condition is no longer met; sending, to the second network switching device, a request for data stored while the first trigger condition was met; receiving data from the second network switching device; and sending the data to the first server.

In another aspect, a method is provided, comprising: receiving, by a second network switching device, from a first network switching device, a forwarded service request, for a first service; loading, by the second network switching device, a loadable module, the loadable module comprising instructions enabling the second network switching device to handle the service request; and handling, by the second network switching device, the service request.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of systems and methods for providing network resilience using interim nodes provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

In examples, edge nodes may be used to provide content and/or services to client devices. For example, a network may comprise a content-delivery network (CDN) where content and/or computing services are delivered to clients via a logically closest edge node. In nonexclusive examples, a CDN distributes content (e.g., resources) efficiently to clients on behalf of one or more content providers. Using a CDN, a content provider is able to take pressure off (and thereby reduce the load on) its own servers (e.g., its origin servers). Clients benefit by being able to obtain content more consistently and with fewer delays.

In examples, multiple edge nodes in the CDN (or other provider network) can process or handle any particular client request for content (e.g., for one or more resources). In examples, the client device(s) may be connected to the CDN or other provider network via an access network, such as an internet service provider (ISP) network. In examples, a rendezvous system associates a particular client request with a "best" or "optimal" (or "least worst") edge node to deal with that particular request. The "best" or "optimal" edge node may be one that is close to the client device (by some measure of network cost). In some examples, the rendezvous system may also ensure that the assigned edge node is not overloaded. Generally, the chosen edge node (e.g., the edge node chosen by the rendezvous system for a client request) can deliver the requested content or computing services to the client device or can direct the client device to somewhere that the client device can try to obtain the requested content or computing services. In some examples, to fulfill a client request, the edge node will obtain content or computing services from core network devices that are not directly accessible to the client device(s). As used herein, each edge node may comprise one or more computing devices and storage devices, which are generally co-located. For example, an edge node may comprise one or more edge server(s) that provide computing and/or storage services and at least one network switch or router to route traffic to and from the edge node.

Figure 1:
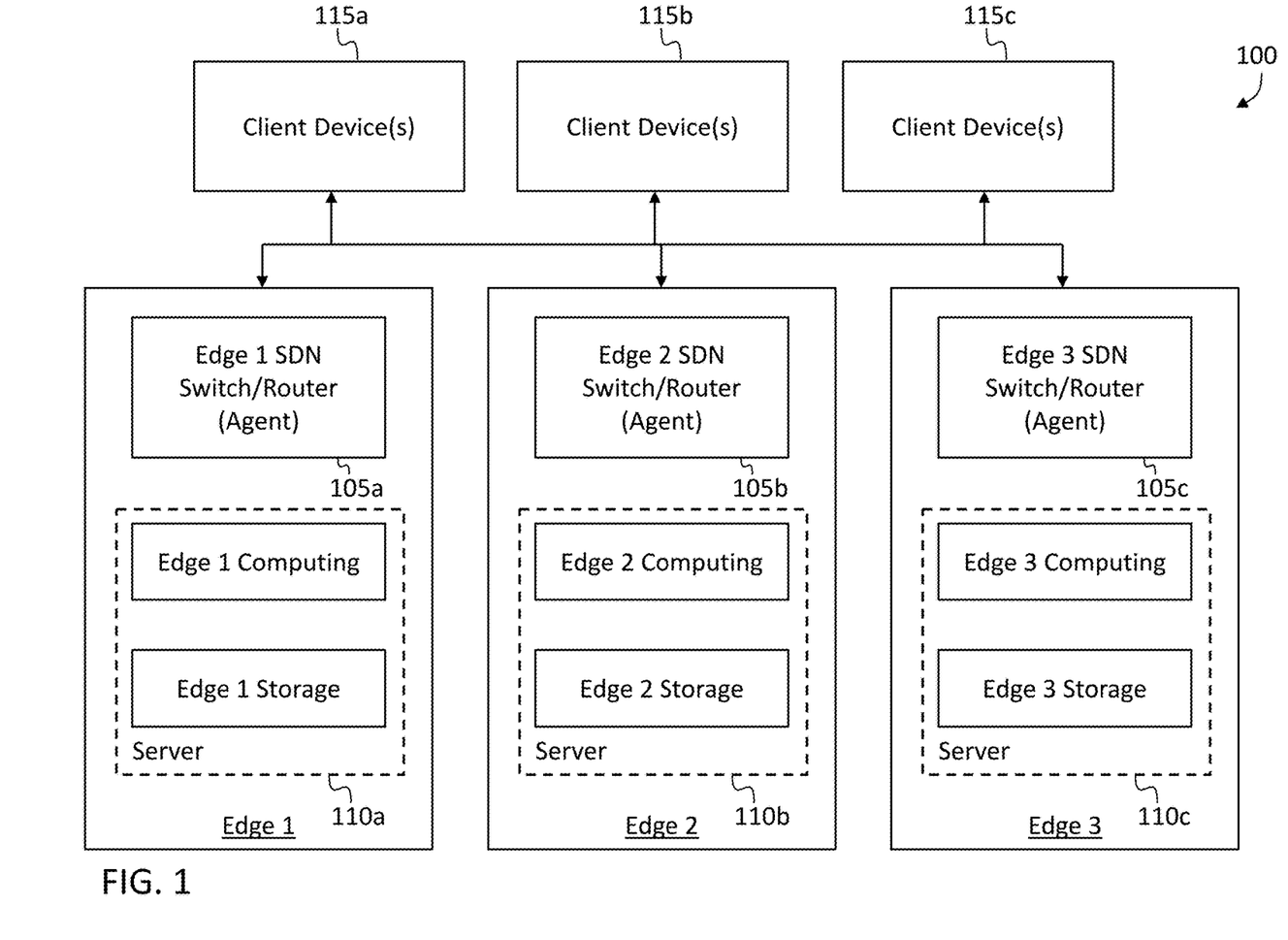
FIG. 1 is a block diagram of a networked system, according to an example of the present disclosure.

FIG. 1 shows a system 100 in which some examples may be implemented. Referring to FIG. 1, a first network node, which may be referred to as "Edge 1" may include a first network switching device 105a (e.g., a switch or a router (which may be a software-defined networking (SDN) element) and one or more first server 110a connected to the first network switching device 105a. The first server 110a may include computing and storage resources, as shown. Additional nodes may also be present; two such nodes, labelled "Edge 2" and "Edge 3", and including (i) a second network switching device 105b and a third network switching device 105c, respectively, and (ii) a second server 110b and a third server 110c, respectively, are shown in FIG. 1. Although for simplicity only one edge server 110 is shown at each edge node, edge nodes may include more edge server(s) that are locally networked and/or load balanced, as needed. For example, each node may have multiple servers and storage devices connected, e.g., in a local area network (LAN), and such a LAN may be a node.

The first network switching device 105a may host a first agent (e.g., the first agent may run on the first network switching device 105a). In examples, an agent is a computing program that performs particular tasks on behalf of its host machine, such as the network switching device(s) 105. The first agent may participate in providing network resilience as described herein. In normal operation, the first agent may monitor operation of the server 110a as it provides services to one or more client devices, e.g., a first client device 115a, a second client device 115b, and a third client device 115c (which may be referred to generally as client devices 115). The first client device 115a may be any client device making use of services available at edge server(s) 110 (e.g., by sending service requests to the first network switching device 105a); for example, it may be a security camera configured to capture video and to stream the video to the first server 110a, which may store the video and perform certain analysis functions (e.g., facial recognition) on the video stream. In this example, the sending of the video stream may be considered a request, to the first server 110a, to store and analyze the video. In other examples, services available at the servers 110 may include (i) gathering vibration and temperature data from factory equipment to monitor for potential problems or safety hazards, or (ii) delivery of content, in a content delivery network, in which the edge nodes may cache content and provide it to the client device(s) upon request. Latency may be important in the case of content delivery because video content, for example, may be streamed in discrete pieces and may need to be continued at a reasonable rate so that the client device does not run out of buffered content before the next piece is delivered. As used herein, a "service request" is any communication from a client device 115, addressed to a server, that, in normal operation, results in the server performing a service for the client device 115.

In some circumstances, the ability of the first server 110*a* to handle service requests for the first service from, e.g., the first client device 115*a* may become degraded, for any of various reasons. For example, the load on the server may increase generally, or the load on the server for providing the first service may increase, as a result, for example, of requests from other client devices 115, or of changes in the service itself (e.g., a change implemented as a software change in the first client device 115*a*). As another example, the first server 110*a* may fail.

When the ability of the first server 110*a* to handle service requests for the first service becomes degraded, the first agent may detect a trigger condition (discussed in further detail below), and the first agent may transition to an offloading state, in which it may take any of various actions to offload the first server 110*a* and mitigate the impact on the client devices 115. For example, in the event of a degradation in service, while the first server 110*a* continues to operate, with reduced performance, the first agent may forward some or all of the service requests for the first service to a second agent (running in the second network switching device 105*b*), which may operate as a fallback server (as part of an "interim node") for one or more services ordinarily provided by the first server 110*a*. The second agent may then handle these service requests, e.g., storing data in the storage resources of the second server 110*b*, and sending a response to the first agent, for forwarding to the client device 115 that originated the service request. When operating in the offloading state, the first agent may inspect (e.g., by calling a service identification function) each received packet to determine whether it is or is part of a service request for a service being forwarded to a different destination, and it may then forward such packets accordingly. For example, a first service identification function may be used to determine whether a packet is or is part of a request for the first service. The inspection may be computationally inexpensive (as discussed in further detail below).

In some examples, the first agent queries the second agent to determine whether the second agent is capable of providing the first service, before (upon receiving an affirmative response) forwarding service requests for the first service to the second agent. Once the first agent begins to forward service requests for the first service to destinations other than the first server 110*a*, it may notify the first server 110*a* that it has begun to forward service requests for the first service to destinations other than the first server 110*a*, so that the first server 110*a* is aware that it may not be in possession of all of the data for the first service (for the first client). After being notified in this manner, if the first server 110*a* receives a query for data related to the first service, it may include, in the query response, a warning that its response may be incomplete, or it may request any relevant data, e.g., from the second agent, before responding to the query.

To be able to operate as a fallback server for one or more services, the second agent may be configured to load any of one or more modules, the execution of which may give the second agent some (or all) of the capabilities, ordinarily possessed by the first server 110*a*, for handling service requests for various services. The loadable module may be loaded, for example, from persistent storage in the second server 110*b*, or from any other suitable storage location, e.g., from persistent storage in the second network switching device 105*b*, or from another server, e.g., a remote server on the internet (such as a server maintained and operated for this purpose by the manufacturer of the client device 115). In some examples the loadable module may be available only to subscribers having purchased a subscription. Upon first receiving a forwarded request for the first service from the first agent, the second agent may (i) identify the service being requested as being the first service, (ii) load a module (e.g., an executable program or container) for the first service, and (iii) by calling the appropriate function or method in the executable module, handle the service request. In some examples, the executable module is loaded at startup, and used by the second agent only when needed. In some examples, the loadable module includes a function or method (which may be referred to as a "service identification function" for the first service) that the second agent may call (passing in a received service request) to determine whether the service request is a request for the first service. In some examples the service identification function (or a set of such functions, one for each service that the second agent is capable of providing) is loaded at startup, and the loadable module for any service is only loaded when a need for it is detected by the second agent.

In some examples, the capabilities of the second agent for handing service requests for the first service are less than (e.g., inferior to) the capabilities of the first server 110*a* for handling service requests for the first service. This may be advantageous in (i) allowing the second agent (which may have access only to computing resources inferior to those of the first server 110*a*) to process the service requests with acceptable latency and (ii) limiting the extent to which the handling of requests for the first service degrades the second agent's ability to perform its other functions, e.g., functions other than the handling of requests for the first service. In some examples, the second agent may provide a lower level of service, when handling service requests, than the first server 110*a* would provide (e.g., it may store less than all of the data that a client has requested be stored), so as, for example, (i) to avoid excessively burdening the second network switching device 105*b*, (ii) to avoid excessively burdening storage (e.g., in the second server 110*b*) used to handle the service request, or (iii) to reduce the amount of data that is to be transferred back to the first server 110*a* once normal operation is restored. For example, if the service includes storing streaming video from a security camera, then the second agent may transcode the video stream to a lower-data-rate stream before sending the data to the second server 110*b* to be stored. As used herein, a second set of capabilities is "less than" a first set of capabilities if the first set of capabilities includes at least one capability absent from the second set of capabilities or that is available in the first set of capabilities to a higher degree than in the second set of capabilities (e.g., larger available storage in the first server 110*a* than the second server 110*b*).

In some examples, the inspecting of service requests to determine whether the service request is a request for a particular service (e.g., for the first service) is performed by a function or method (e.g., a service identification function) that is sufficiently simple that performing this determination for all service requests received by the second agent does not significantly burden the second network switching device 105*b*. In some examples, this inspecting of service requests includes comparing the destination internet protocol (IP) address of the service request and the destination port number of the service request to a set of IP address and port combinations ordinarily employed by service requests for the particular service (even if that particular service is not currently supported by the second edge server 110*b*). For example, the (second) agent of switching device 105*b* may receive all traffic from edge 1 on a first port, and may store an association of one or more destination IP addresses with the particular service.

In the event that the first server 110*a* fails entirely or otherwise ceases to handle service requests for the first service, the first agent may similarly forward service requests for the first service to the second agent. In some circumstances, however, such forwarding may place an unacceptable burden on the second agent and the second network switching device 105*b*, especially if the first server 110*a* has failed entirely and service requests for all services normally provided by the first server 110*a* are being forwarded elsewhere, potentially to the second agent, by the first agent. In some examples, therefore, when the first server 110*a* fails entirely, or when the volume of service requests to be forwarded elsewhere by the first agent otherwise exceeds a threshold, the first agent may forward the service requests to a plurality of other agents (e.g., a set of other agents including a third agent (running in the third network switching device 105*c*) (and/or additional agents/switching devices)). The requests may be forwarded, for example, in a round robin fashion to a set of available fallback agents, or in a round robin fashion per service (with, in some circumstances, the set of candidate fallback agents being different for different services, e.g., based on the respective capabilities of the fallback agents). In another example, the requests may be forwarded to other agents based on the service being requested, with, for example, all requests for the first service being forwarded to the second agent, and all requests for a second service being forwarded to the third agent, etc.

In some examples, the second agent runs in the second server 110*b* instead of running in the second network switching device 105*b*. An advantage of configuring the second agent to run in the second network switching device 105*b*, however, may be that the second network switching device 105*b* may be designed with a greater emphasis on reliability than, e.g., the second server 110*b* (which may be designed with an emphasis on other characteristics, such as cost-effective computing performance and storage capacity). As such, the second agent may be more reliable to coordinate fallback services if it runs on the second network switching device 105*b* than if it runs in the second server 110*b*. Similarly, in some examples, the first agent runs on the first server 110*a*, or for similar reasons as those given above for the second agent, the first agent may run in the first network switching device 105*a*. In such a configuration, even if the first server 110*a* fails entirely, it may be that the first service continues to operate (possibly at a degraded level of service) as a result of forwarding, by the first agent, of service requests to one or more other agents.

As mentioned above, when a trigger condition is detected (e.g., when it is determined that the trigger condition is met), the first agent may begin forwarding service requests to other agents instead of forwarding them to the first server. The trigger condition may be met, for example, when the first server 110*a* fails, or when the load on the first server 110*a* (measured, for example, as (i) load on a central processing unit (CPU) of the first server 110*a*, or as (ii) memory usage by processes running on the first server 110*a*) exceeds a certain threshold. In some examples, the first agent periodically measures (e.g., using a suitable diagnostic such as a "ping" command) the round trip network latency between the first agent and the second agent, and if the internal latency measured, by the first agent, for the handling of service requests by the first server 110*a* exceeds the measured round-trip latency to the second agent by more than a threshold amount, the trigger condition is met. Other trigger conditions are possible and contemplated.

Once the need for the forwarding of service requests, by the first agent, to the second agent has passed (e.g., as a result of (i) the functionality of the first server having been restored, (ii) the sources of unusually high demand on the first server 110*a* having been eliminated, or (iii) the first server 110*a* having been upgraded), the second agent and the first agent may negotiate the transfer, to the first server 110*a*, of data stored, by the second server 110*b*, in response to service requests previously forwarded to the second agent by the first agent. This may be accomplished, for example, using file transfer or a database connection. In addition, the second agent may cause the second server 110*b* to complete any requests already forwarded to the second server 110*b* and/or provide information about the state of any such operations to the first agent for the first server 110*a* to complete any in-process operations.

In some examples, a first entity may provide the first client device 115*a* to the user of the first client device 115*a*, and the same entity may supply the loadable module (and the first service identification function, if separate from the first loadable module) to the operator of the network. For example, the manufacturer of a security camera may provide the security camera to users and also supply the loadable module and the first service identification function to network operators. In some examples, in addition to the first network switching device 105*a* relying on one or more other network switching devices as fallback resources, the other network switching devices may rely on each other and on the first network switching device 105*a* as a fallback resource.

Figure 2A:
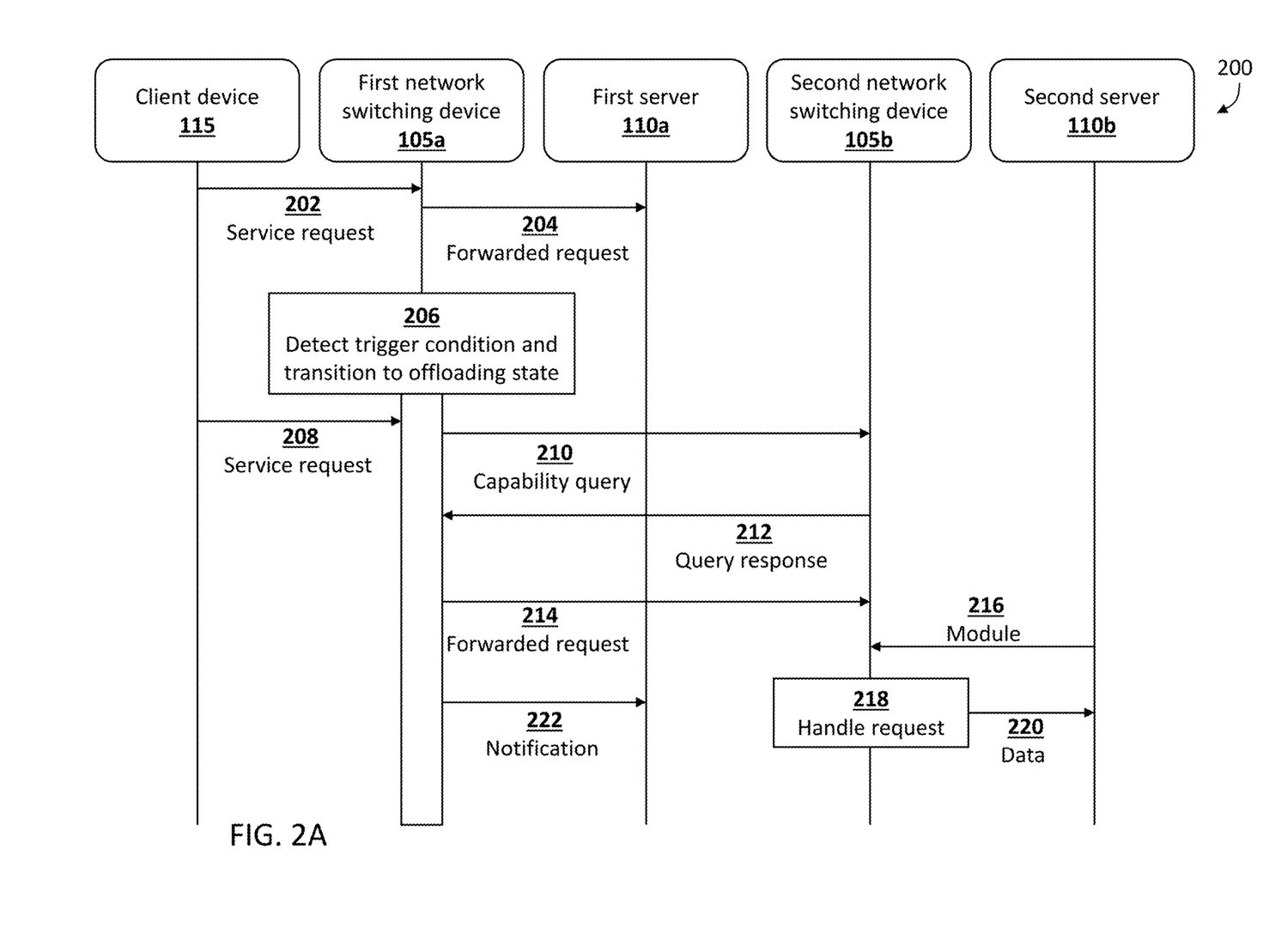
FIG. 2A illustrates a first portion of a method for providing network resilience, according to an example of the present disclosure.

FIG. 2A depicts a first portion of an example method 200 in which aspects of the present technology may be practiced by a client device 115, a first network switching device 105*a*, a first server 110*a*, a second network switching device 105*b*, and a second server 110*b*. As discussed, in examples, at 202, a client device 115 may send, and the first network switching device 105*a* may receive (e.g., a first agent running in the first network switching device 105*a* may receive), a service request. Actions ascribed, in the present description of FIGS. 2A and 2B, to the first network switching device 105*a* and the second network switching device 105*b* may, in some examples, be performed by respective agents running on the first network switching device 105*a* and on the second network switching device 105*b*. The service request may be, for example a request to store video from a security camera. The first network switching device 105*a* may be, or include, for example, a router or a switch. The request may be transmitted in one or more packets, e.g., Transmission Control Protocol (TCP) packets or User Datagram Protocol (UDP) packets. The payload of these packets may include data (e.g., video data) formatted or encoded in a manner specific to (e.g., defined and implemented by the manufacturer of) the client device 115.

Upon receipt of the service request, the first network switching device 105*a*, if it is in a normal operating state (e.g., not in the offloading state), may, at 204, forward the service request to the first server 110*a*, and the first server 110*a* may receive the forwarded service request from the first network switching device 105*a*, and handle the service request. The first network switching device 105*a* may forward the one or more packets of the service request unchanged. The first server 110*a* may be configured (e.g., as a result of a suitable program (e.g., a suitable set of instructions) having been loaded into a memory of the first server 110*a*) to handle the service request, e.g., to parse the payload, and to take appropriate action (e.g., to analyze or store video data that may be part of the payload).

If the circumstances of the first server 110*a* change, e.g., so that the ability of the first server 110*a* to handle service requests become degraded, the first server 110*a* may, at 206, detect a trigger condition and transition to the offloading state. As discussed, the trigger condition may be met, for example, when the first server 110*a* fails, or when the load on the first server 110*a* exceeds a certain threshold.

If, for example, as illustrated at 208, the first network switching device 105*a* receives another service request while it is in the offloading state, the first network switching device 105*a* may prepare to forward the new service request elsewhere, e.g., to a destination different from the first server 110*a*.

In examples, at 210, the first network switching device 105*a* may send, and the second network switching device 105*b* may receive, a query regarding whether the second network switching device 105*b* has the capability to handle the service request. The query may identify the nature of the service request, for example by identifying the type of client device 115 that generated the service request. Such an identification may, for example, include the name of the manufacturer of the client device 115 and the model name (or other identifying information, such as a serial number or Media Access Control (MAC) address). In examples, as discussed, the first network switching device 105*a* determines which type of service the service request is a request for by calling a service identification function, passing in the service request as an argument. In some examples the service request itself may, at this stage in the process, be forwarded, by the first network switching device 105*a*, to the second network switching device 105*b* and the forwarding of the service request may operate both (i) as a query to determine whether the second network switching device 105*b* has the capability to handle the service request, and (ii) as a request to handle the service request.

The second network switching device 105*b* may then, at 212, send (and the first network switching device 105*a* may receive) a query response indicating whether the second network switching device 105*b* has the capability to handle the service request. The response may be a Boolean response simply indicating whether or not the second network switching device 105*b* has the capability to handle the service request, or it may contain additional information, e.g., whether the second network switching device 105*b* has limited capabilities to handle the service request or whether the second network switching device 105*b* will provide a degraded service in handling the service request (e.g., by storing less than all of the data a service request may request to have stored).

If the query response notifies the first network switching device 105*a* that the second network switching device 105*b* has the capability to handle the service request, then the first network switching device 105*a* may, at 214, forward (and the second network switching device 105*b* may receive) the service request.

In response to receiving the service request, the second network switching device 105*b* may load, at 216, a loadable module (e.g., from persistent storage in the second server 110*b* (as shown), or from any other suitable storage location, e.g., from persistent storage in the second network switching device 105*b*, or from another server, e.g., a server on the internet (such as a server maintained and operated for this purpose by the manufacturer of the client device 115). The loadable module may include a function for performing the service requested by the service request, e.g., the loadable module may include executable instructions that when executed by the second network switching device 105*b* cause the second network switching device 105*b* to process (e.g., to handle) the service request.

The second network switching device 105*b* may then, at 218, handle the service request. As discussed, the handling of the service request may involve storing or analyzing data (e.g., video data) that may be part of the service request.

In some examples, the second network switching device 105*b* (e.g., the agent running on the second network switching device 105*b*) may, instead, check whether the second server 110*b* has the capability to handle the service request. If the second server 110*b* does not have the capability, the agent on the second network switching device 105*b* may cause the second server 110*b* to load a loadable module providing the capability. The second server 110*b* may then handle the service request. In some examples, the loading, by the second server 110*b*, of the loadable module, is contingent on the second server 110*b* having sufficient resources (e.g., memory, disk space, and processing power) to handle the service request once the loadable module is loaded.

As such, the handling of the service request may involve storing, at 220, data in the second server 110*b* (e.g., in persistent storage of the second server 110*b*). The data may be stored, for example, as one or more files, saved in the persistent storage of the second server 110*b*. In other examples, the data may be stored in a database in the second server 110*b*.

The first network switching device 105*a* may also, at 222, send to the first server 110*a*, and the first server 110*a* may receive, a notification that the first network switching device 105*a* has forwarded or will be forwarding at least one service request (for the service requested by the service request) to a recipient other than the first server 110*a*. This information may be used by the first server 110*a*, for example, if the first server subsequently receives a request for data associated with the service (e.g., from the client device 115, or from another device (e.g., a computer that a user may be using to retrieve data stored in response to service requests)). For example, a user may send a request for all data stored during a certain interval of time. If the interval of time includes times at which the first network switching device 105*a* forwarded service requests to the second network switching device 105*b*, then, to compile a complete response, the first server 110*a* may submit a similar request for data to the second network switching device 105*b*, which may, in response, send the first server 110*a* any data stored (e.g., in the second server 110*b*) as a result of such service requests.

Figure 2B:
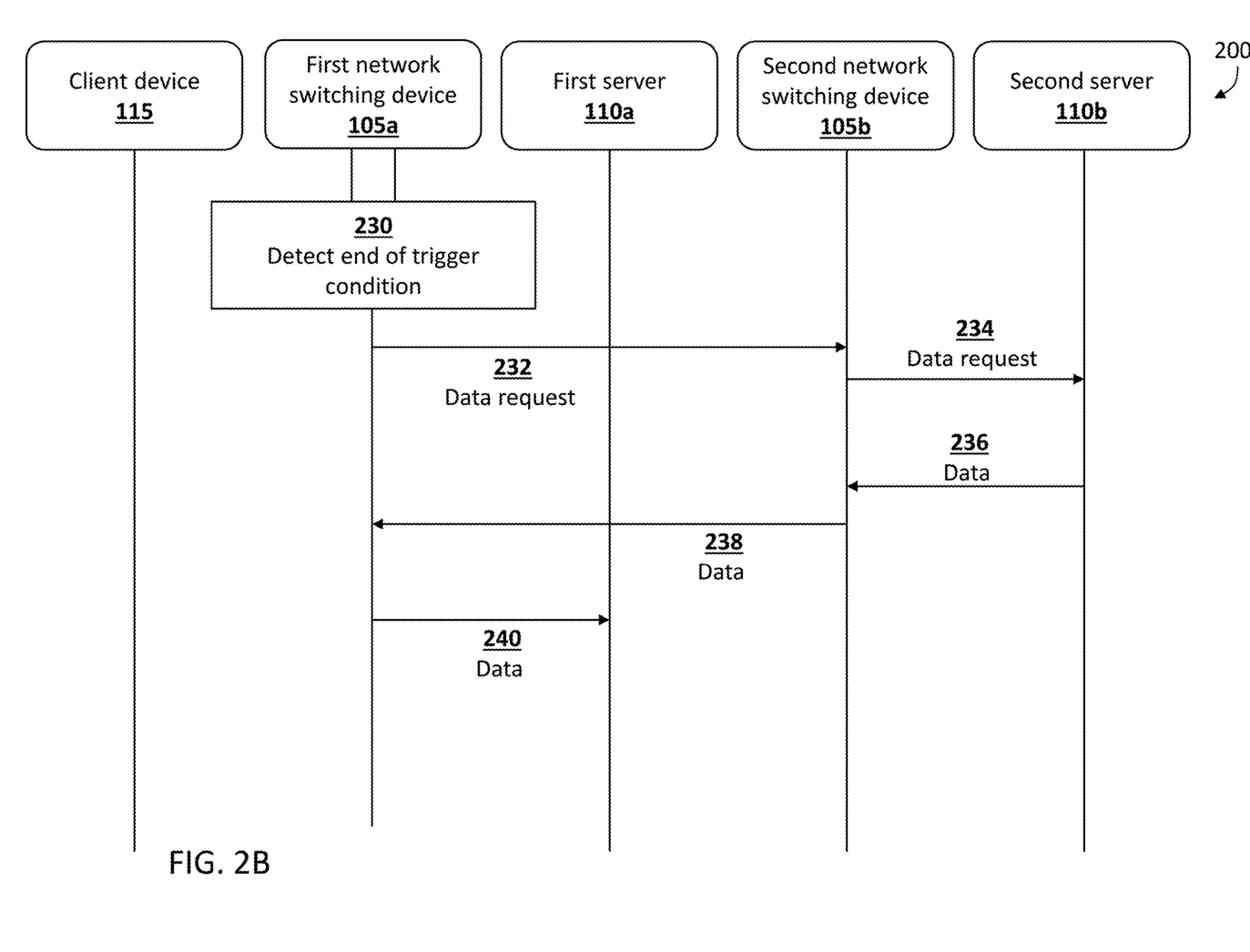
FIG. 2B illustrates a second portion of a method for providing network resilience, according to an example of the present disclosure.

FIG. 2B depicts a second portion of the example method 200, in which aspects of the present technology may be practiced by a client device 115, a first network switching device 105*a*, a first server 110*a*, a second network switching device 105*b*, and a second server 110*b*. At 230, the first network switching device 105*a* may detect the end of the trigger condition. For example, it may determine that the trigger condition is no longer met. This may involve, for example, determining that the load on the first server 110*a* has fallen below the threshold (or that the load on the first server 110*a* has fallen below a second threshold, lower than the threshold used to determine that the trigger condition is met). As another example, it may determine that the first server 110*a*, which had failed, has been restored to operation.

The first network switching device 105*a* may then, at 232, send a request to the second network switching device 105*b*.

This request may be or include a request for any data saved, by the second network switching device 105b, in connection with service requests forwarded, during the interval of operation in the offloading state, by the first network switching device 105a to the second network switching device 105b.

The second network switching device 105b may, in response to receiving this request, generate one or more data requests and send, at 234, these requests to the second server 110b. Handling of these requests may be done under the control of the loadable module, which may enable the second network switching device 105b to be aware of the formatting of the data as stored in the second server 110b (e.g., the loadable module may cause the second network switching device 105b to be aware of how the data is segmented for saving in a plurality of files, and it may cause the second network switching device 105b to be aware of the file names and file locations).

The second server 110b may return, at 236, the requested data to the second network switching device 105b. The data may be returned to the first network switching device 105a using, e.g., a file transfer.

The second network switching device 105b may then, at 238, send the data to the first network switching device 105a. The data transmitted to the first network switching device 105a may be formatted according to a pre-specified format, by the loadable module, in a manner that enables the first server 110a to parse the data.

The first network switching device 105a may forward the data, at 240, to the first server 110a, which may parse the data and store it (e.g., in the persistent storage of the first server 110a) so that at the completion of this operation, all of the data associated with service requests sent to the first network switching device 105a by the client device 115 may be stored in the first server 110a. This consolidation of the data in one server (the first server 110a) may facilitate the responding to subsequently received queries regarding this data.

Figure 3:
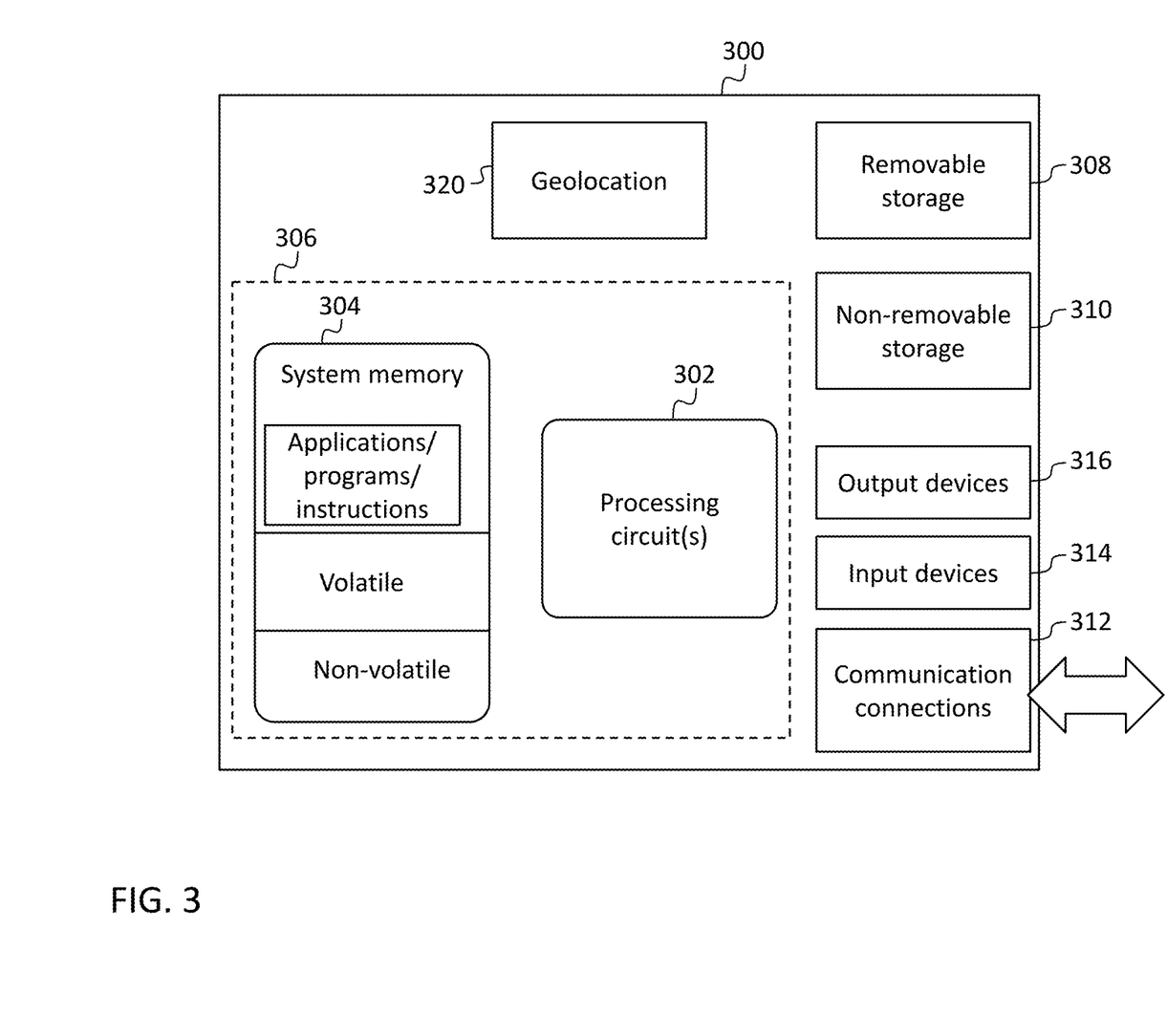
FIG. 3 is a block diagram of an operating environment, according to an example of the present disclosure.

FIG. 3 depicts an example of a suitable operating environment 300, portions of which may be used to implement the first network switching device 105a, the first server 110a, the second network switching device 105b, the second server 110b, or other devices that may include computing functionality within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), nonvolatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

In examples, systems and methods for providing network resilience using interim nodes are provided. In an aspect, a system includes a first network switching device; a first server, connected to the first network switching device; and a second network switching device. The first server may be configured to provide a first service. The first network switching device may be configured: to receive a first service request, for the first service, from a client device; to forward the first service request to the first server; to detect a first trigger condition; in response to detecting the first trigger condition, to transition to an offloading state; to receive, in the offloading state, a second service request, for the first service; and to forward the second service request to the second network switching device. The second network switching device may be configured to handle the second service request.

In examples, the first server has a first set of capabilities for providing the first service; and the second network switching device has a second set of capabilities for providing the first service, the second set of capabilities being less than the first set of capabilities.

In examples, the first network switching device is further configured to determine that the second service request is a request for the first service.

In examples, the second network switching device is further configured to determine that the second service request is a request for the first service.

In examples, the second network switching device is configured to load a module, the module containing instructions that, when executed by the second network switching device, cause the second network switching device to provide the first service.

In examples, the detecting of the first trigger condition comprises determining that the first server has failed.

In examples, the first network switching device is further configured: to receive, in the offloading state, a third service request; to forward the third service request to the second network switching device; to receive, in the offloading state, a fourth service request from a client; and to forward the fourth service request to a third network switching device.

In examples, the third service request is a request for the first service, and the fourth service request is a request for the first service.

In examples, the third service request is a request for the first service, and the fourth service request is a request for a second service, different from the first service.

In examples, the detecting of the first trigger condition comprises determining that a measure of load, on the first server, has exceeded a threshold.

In examples, the first network switching device is further configured to notify the first server that it has transitioned to the offloading state.

In examples, the first network switching device is further configured to send a query to the second network switching device to determine whether the second network switching device is configured to provide the first service.

In examples, the handling of the second service request comprises: receiving data from the client device; and storing data from the client device.

In examples, the storing of data from the client device comprises storing less than all of the data from the client device.

In examples, the second network switching device is further configured to send the data to the first server.

In examples, the detecting of the first trigger condition comprises determining that an internal latency of the first server exceeds a round trip network latency between the first network switching device and the second network switching device by more than a threshold amount.

In another aspect, a method is provided, comprising: receiving, by a first network switching device, a first service request, for a first service, from a client device; forwarding the first service request to a first server; detecting, by the first network switching device, a first trigger condition; in response to detecting the first trigger condition, transitioning to an offloading state; receiving, in the offloading state, a second service request, for the first service; sending a query to a second network switching device to determine whether the second network switching device is configured to provide the first service; receiving an affirmative response, to the query, from the second network switching device; and forwarding the second service request to a second network switching device.

In examples, the first server has a first set of capabilities for providing the first service; and the second network switching device has a second set of capabilities for providing the first service, the second set of capabilities being less than the first set of capabilities.

In examples, the method further comprises: detecting that the first trigger condition is no longer met; sending, to the second network switching device, a request for data stored while the first trigger condition was met; receiving data from the second network switching device; and sending the data to the first server.

In another aspect, a method is provided, comprising: receiving, by a second network switching device, from a first network switching device, a forwarded service request, for a first service; loading, by the second network switching device, a loadable module, the loadable module comprising instructions enabling the second network switching device to handle the service request; and handling, by the second network switching device, the service request.

As such, examples of the present disclosure have various technical advantages. Among other examples, the present systems and methods may save computing resources by allowing interim nodes to be determined and instantiated when needed, rather than dedicating computing resources to failover or disaster recovery functions.

Although exemplary embodiments of systems and methods for providing network resilience using interim nodes have been specifically described and illustrated herein, many modifications and variations will be apparent to those skilled in the art. Accordingly, it is to be understood that systems and methods for providing network resilience using interim nodes constructed according to principles of this disclosure may be embodied other than as specifically described herein. The invention is also defined in the following claims, and equivalents thereof.

What is claimed is:

1. A system, comprising:
    a first network switching device;
    a first server, connected to the first network switching device; and
    a second network switching device,
    the first server being configured to provide a first service;
    the first network switching device being configured:
        to receive a first service request, for the first service, from a client device;
        to forward the first service request to the first server;
        to detect a first trigger condition;
        in response to detecting the first trigger condition, to transition to an offloading state;
        to receive, in the offloading state, a second service request, for the first service; and
        to forward the second service request to the second network switching device,
    the second network switching device being configured to handle the second service request and to load a module, the module containing instructions that, when executed by the second network switching device, cause the second network switching device to provide the first service.

2. The system of claim 1, wherein:
    the first server has a first set of capabilities for providing the first service; and
    the second network switching device has a second set of capabilities for providing the first service, the second set of capabilities being less than the first set of capabilities.

3. The system of claim 1, wherein the first network switching device is further configured to determine that the second service request is a request for the first service.

4. The system of claim 1, wherein the second network switching device is further configured to determine that the second service request is a request for the first service.

5. The system of claim 1, wherein the detecting of the first trigger condition comprises determining that the first server has failed.

6. The system of claim 5, wherein the first network switching device is further configured:
to receive, in the offloading state, a third service request;
to forward the third service request to the second network switching device;
to receive, in the offloading state, a fourth service request from a client; and
to forward the fourth service request to a third network switching device.

7. The system of claim 6, wherein:
the third service request is a request for the first service, and
the fourth service request is a request for the first service.

8. The system of claim 6, wherein:
the third service request is a request for the first service, and
the fourth service request is a request for a second service, different from the first service.

9. The system of claim 8, wherein the first network switching device is further configured to notify the first server that it has transitioned to the offloading state.

10. The system of claim 1, wherein the detecting of the first trigger condition comprises determining that a measure of load, on the first server, has exceeded a threshold.

11. The system of claim 1, wherein the first network switching device is further configured to send a query to the second network switching device to determine whether the second network switching device is configured to provide the first service.

12. The system of claim 1, wherein the handling of the second service request comprises:
receiving data from the client device; and
storing data from the client device.

13. The system of claim 12, wherein the storing of data from the client device comprises:
storing less than all of the data from the client device.

14. The system of claim 12, wherein the second network switching device is further configured to send the data to the first server.

15. The system of claim 12, wherein the detecting of the first trigger condition comprises determining that an internal latency of the first server exceeds a round trip network latency between the first network switching device and the second network switching device by more than a threshold amount.

16. A method, comprising:
receiving, by a first network switching device, a first service request, for a first service, from a client device;
forwarding the first service request to a first server;
detecting, by the first network switching device, a first trigger condition;
in response to detecting the first trigger condition, transitioning to an offloading state;
receiving, in the offloading state, a second service request, for the first service;
sending a query to a second network switching device to determine whether the second network switching device is configured to provide the first service;
receiving an affirmative response, to the query, from the second network switching device;
forwarding the second service request to a second network switching device; and
loading, by the second network switching device, a module, the module containing instructions that, when executed by the second network switching device, cause the second network switching device to provide the first service.

17. The method of claim 16, wherein:
the first server has a first set of capabilities for providing the first service; and
the second network switching device has a second set of capabilities for providing the first service, the second set of capabilities being less than the first set of capabilities.

18. The method of claim 16, further comprising:
detecting that the first trigger condition is no longer met;
sending, to the second network switching device, a request for data stored while the first trigger condition was met;
receiving data from the second network switching device; and
sending the data to the first server.

* * * * *